United States Patent [19]

Weber

[11] Patent Number: 5,029,759

[45] Date of Patent: Jul. 9, 1991

[54] CURVED HOLE MACHINING METHOD AND FUEL INJECTOR FORMED THEREBY

[75] Inventor: Harold G. Weber, Columbus, Ind.

[73] Assignee: Cummins Engine Company, Inc., Columbus, Ind.

[21] Appl. No.: 437,601

[22] Filed: Nov. 17, 1989

[51] Int. Cl.[5] ........................ F02M 61/16; B23H 9/14

[52] U.S. Cl. ............................ 239/533.12; 239/533.2; 219/69.17

[58] Field of Search ........................ 239/533.2–533.12, 239/5; 219/69.12, 69.15, 69.17, 69.2

[56] References Cited

U.S. PATENT DOCUMENTS

| | | | |
|---|---|---|---|
| 2,902,584 | 9/1959 | Ullmann . | |
| 3,388,232 | 6/1968 | Dreisin . | |
| 3,402,279 | 9/1968 | Sazhin | 219/69.15 X |
| 3,506,800 | 4/1970 | O'Connor | 219/69.2 |
| 3,995,134 | 11/1976 | Dudden | 219/69.15 |
| 4,069,978 | 1/1978 | El Moussa . | |
| 4,465,231 | 8/1984 | Sharp | 239/533.8 X |

FOREIGN PATENT DOCUMENTS

| | | | |
|---|---|---|---|
| 357247 | 3/1938 | Italy | 239/533.12 |
| 361056 | 7/1938 | Italy | 239/533.9 |
| 400836 | 11/1933 | United Kingdom | 239/533.12 |

OTHER PUBLICATIONS

"Effect of Spray Bore Design and Machining on Fuel Injector Performance" by Dr. Ing. G. M. Musso published by Diesel & Fas Trubine Worldwide.

*Primary Examiner*—Andres Kashnikow
*Assistant Examiner*—William Grant
*Attorney, Agent, or Firm*—Sixbey, Friedman, Leedom & Ferguson

[57] ABSTRACT

A method of forming curvilinear injector spray holes to produce an improved spray from the nozzle tip of a fuel injector is provided. The method uses electrical discharge machining in combination with a novel electrode to form a plurality of curvilinear spray holes in the injector nozzle tip which direct the fuel spray from the nozzle to produce an efficient, enhanced spray. The novel EDM electrode is preferably formed in the configuration of a constant pitch helix having a radius substantially equal to the radius of curvature of the curvilinear spray hole.

16 Claims, 3 Drawing Sheets

30
44
38
32
34
40
36
42

50
58
56
A
52
3
4
4
62
64

54
60

56
d
P
P
P
P
2R
A
A

J
J
52
X
r3
80
78
74
C
r1
r2
76
54
ℓ2
60
50
C
70
ℓ1

CURVED HOLE MACHINING METHOD AND FUEL INJECTOR FORMED THEREBY

TECHNICAL FIELD

The present invention relates generally to a method of machining curved fluid passages and specifically to an electrical discharge machining (EDM) method for producing curved spray holes in a fuel injector nozzle.

The spray holes for discharging fuel provided in a conventional fuel injector nozzle sac are typically drilled at approximately right angles to the injector axis. As a result, the spray holes are oriented so that the fuel flow must enter the holes at a sharp angle from the approximately axial flow through the injector. The abrupt turn the fuel flow must make to exit the spray holes interferes with the delivery of an optimum spray of fuel from the injector tip.

Changing the configuration of the spray holes to produce less resistance to fuel flow as the fuel exits the nozzle has been proposed by the prior art. U.S. Pat. No. 4,069,978 to El Moussa discloses a fuel injection nozzle wherein the spray holes or bores have flared edges at the fuel entrance side of the bores. The bores described in this patent, however, are still substantially perpendicular to the injector axis and require the fuel flow to be diverted from the axial flow into the sac to enter the bores at a rather sharp angle.

The available methods of machining, moreover, do not produce injector nozzle spray holes or bores that are oriented in a direction relative to the injector fuel flow to produce an optimum spray. U.S. Pat. No. 3,388,232 to Dreisin discloses a method of machining a fuel injection nozzle which includes the electrical discharge machining of the nozzle body. This method, however, is employed solely to form the central axial bore in the injector body. The nozzle spray holes are drilled angularly relative to the bore and, consequently, the fuel is required to enter them at an abrupt angle to form the fuel spray.

U.S. Pat. No. 2,902,584 to Ullmann discloses a machining method capable of producing holes having a curved, semicircular configuration. In the electric erosion machining method described in this patent, the electrode used to form the hole conforms generally to the configuration of the hole to be machined and is directed into the workpiece to be machined in a straight feed direction perpendicular to the surface of the workpiece so that the central axis of the hole or channel thus formed is perpendicular to the workpiece surface. Ullmann discloses the use of electrodes that have helical and other configurations. The electrode configuration selected depends on the hole or channel configuration desired. A helical electrode, for example, will produce a helical channel. The helical channels or holes machined according to Ullmann's method, moreover, are intended to direct a fluid around the inside of a solid body. Ullmann does not suggest the use of any of the disclosed electrode configurations to produce a curved spray hole in a fuel injector nozzle to optimize the spray, nor does Ullmann even remotely allude to machining holes with a helical electrode to optimally guide fluid from a cavity to form a jet.

The prior art, therefore, fails to disclose a method of machining spray holes or bores in a fuel injector nozzle tip having a configuration curved to guide and facilitate the flow of fuel to be sprayed through the holes to produce an optimum spray from the injector tip. Consequently, there is a need for a simple and efficient method of accurately machining curved spray holes in a fuel injector nozzle to produce a curved spray hole with a configuration that optimizes fuel flow from the injector tip and, as a result, produces an optimum spray.

SUMMARY OF THE INVENTION

It is a primary object of the present invention to overcome the disadvantages of the prior art and to provide a method of machining curved spray holes or bores in a fuel injector nozzle which direct the fuel flow from the nozzle in a manner that optimizes the fuel spray from the injector.

It is another object of the present invention to provide a method of electrical discharge machining curved spray holes in a fuel injector nozzle.

It is still another object of the present invention to provide a fuel injector with curved spray holes in the nozzle formed by directing an electrode through the nozzle wall from an exterior entry point to an interior exit point to form a curvilinear hole having a central axis, and a first line is tangent to the hole central axis at the entry point and a second line, more nearly parallel to the axis of the fuel injector central bore than the first line, is tangent to the hole central axis at the exit point.

It is yet another object to provide a fuel injector nozzle with a plurality of curvilinear spray holes.

It is yet a further object of the present invention to provide an electrical discharge machining electrode useful in a simple electrical discharge machining process to form curved spray holes in a fuel injector nozzle.

It is still a further object of the present invention to provide a method of using an electrical discharge machining (EDM) electrode configured to form curved holes to machine a plurality of curved holes in a fuel injector nozzle which facilitate fuel entry into the spray holes and achieve improved injector sprays.

It is yet a further object of the present invention to provide a reusable preformed EDM electrode for machining curved fuel injector holes.

The aforesaid objects are achieved by providing a method of forming spray holes in a fuel injector nozzle which employs an electrical discharge machining (EDM) electrode in an electrical discharge machining method to form spray holes or bores having a curvilinear orientation relative to the injector axis. The machining method of the present invention produces holes having the desired curved configuration using an EDM electrode, preferably in the shape of a constant pitch helix having a radius of curvature equal to the desired radius of curvature of the hole to be formed. A curved spray hole is produced when the EDM electrode enters the injector nozzle exterior wall at a point along a first line tangent to the curvilinear axis of the hole at the entry point and is simultaneously advanced along and rotated about the electrode longitudinal axis to exit the nozzle wall into the interior of the injector at a point along a second line tangent to the curvilinear axis of the hole at the exit point, wherein the second line is more nearly parallel to the axis of the injector central bore than the first line so that the electrode entry and exit points are connected by a curved hole. To form the curvilinear spring hole properly, the helical electrode's rotational velocity ($V_r$) must be equal to the forward speed of advancement along its axis ($V_d$) times its pitch (P: i.e., the number of turns per unit of length), that is $V_r = P\ V_d$. The portion of the helical electrode which remains after machining a curved spray hole can be used to machine the next curved spray hole. The aforesaid objects are additionally achieved by providing a fuel injector nozzle having a plurality of curved circumferential spray holes formed as described herein.

Other objects and advantages will be apparent from an examination of the following description, drawings and claims.

BEST MODE FOR CARRYING OUT THE INVENTION

Figure 1A:
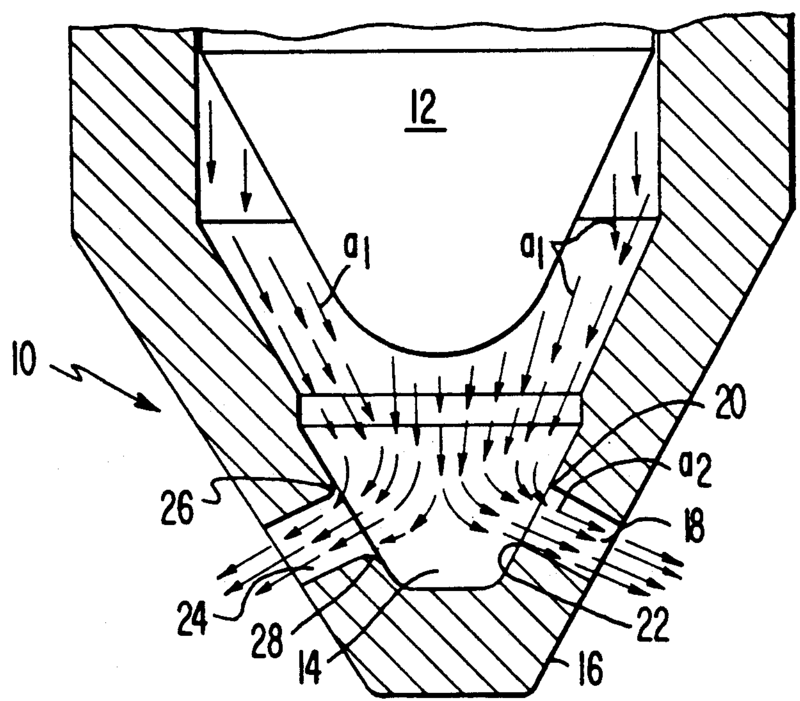
FIGS. 1*a* and 1*b* schematically illustrate the fuel flow at the injector tip of the prior art and the present invention, respectively.
Figure 1B:
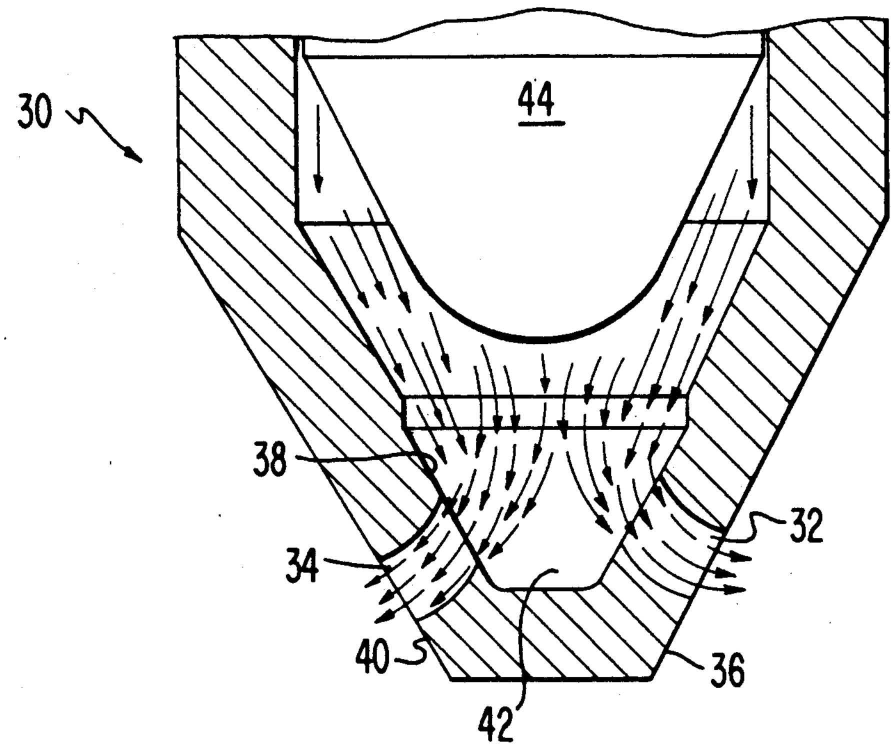

Within a fuel injector having an elongated central cavity, fuel is normally directed along a path approximately coincident with the longitudinal axis of the fuel injector cavity and into a fuel injector nozzle sac which is normally located at the lower end of the central cavity. An injector plunger is usually mounted for reciprocal movement in the central cavity and forms an injection chamber into which fuel is metered during each cycle of injector operation. As the plunger moves downwardly, fuel is forced out of spray holes in the nozzle tip to form the spray of fuel required to support combustion in the engine. FIGS. 1*a* and 1*b* illustrate schematically how this is achieved. The fuel injector nozzle spray holes shown in the drawings are greatly magnified to illustrate the present invention. The actual size of a nozzle spray hole is substantially smaller than the size of those shown.

FIG. 1*a* shows a prior art fuel injector nozzle 10 in cross-section. The injector plunger 12 is shown advancing downwardly toward the sac 14 in the tip 16 of the injector. The flow of fuel within the injector is represented by arrows $a_1$. The fuel flow will generally follow the contour of the interior walls of the injector and, as the plunger 12 advances toward the tip, fuel is forced out of a plurality of spray holes formed in the tip 16 to produce the fuel spray necessary for combustion.

FIG. 1*a* illustrates two different types of prior art spray holes. Although the hole configurations differ, the fuel flow into these two types of holes is substantially similar. A spray hole having the configuration of hole 18 is formed by machining or drilling into the injector at approximately right angles to the injector exterior wall at an orientation about 12 to 17 degrees from the perpendicular. As a result, the fuel inlet edges 20 and 22 form approximately right angles with the nozzle wall. The fuel flow into the spray hole 18 must flow around the upper edge 20 of the hole 18 and, therefore, must turn sharply and abruptly to enter the spray hole as shown by arrows $a_2$ in this portion of FIG. 1*a*. When the fuel flow is required to make such an abrupt turn from the main flow path, optimum flow characteristics are not maintained. Energy is lost, and the resulting spray from the injector is inefficient.

Some improvement in spray characteristics are achieved by forming a spray hole in the injector nozzle having the configuration of spray hole 24 in FIG. 1*a*. The interior or inlet edges 26 and 28 are radiused or flared after drilling to eliminate the angularity which results from conventional methods used to form the spray hole 18. The flaring of the spray hole inlet edge 26 directs the fuel flow through a less abrupt turn into the hole 24 than is required for the fuel flow entering spray hole 18. However, the fuel is still required to make a relatively sharp turn to flow into spray hole 24, and optimum flow characteristics are not maintained.

FIG. 1*b* schematically illustrates the improvement in fuel flow in a fuel injector nozzle 30 including spray holes produced according to the present invention. The injector spray holes 32 and 34, only two of which are shown in FIG. 1*b*, are formed in the nozzle tip 36 in a manner to be explained in detail below. The spray holes produced according to the present invention, in contrast to those of the prior art shown in FIG. 1*a*, have a curvilinear configuration so that the hole is gently curved between the injector interior wall 38 and exterior wall 40. As a result, When fuel is forced toward the injector nozzle sac 42 by the injector plunger 44, the fuel flow is guided smoothly by the curvature of the spray holes 32 and 34 along the flow paths shown by the arrows in FIG. 1*b*. The fuel flow is not required to turn abruptly to enter the curved spray holes 32 and 34 as it is to enter the prior art spray holes 18 and 24 in FIG. 1*a*. Rather, the fuel is directed along smooth, arcuate flow paths and into the curved spray holes 32 and 34. The fuel is also smoothly guided through additional identical curved spray holes (not shown) spaced about the circumference of the nozzle tip 36. The fuel spray thus produced from the spray holes 32 and 34 and from the other curved spray holes (not shown) formed in the injector nozzle according to the present invention produces an optimum, highly efficient fuel injector spray.

As can be seen in FIG. 1*b*, the effective cross sectional area of the fuel cavity defined between injector plunger 44 and injector nozzle sac 42 is larger than that of any one of the curved spray holes 32 and 34.

The present invention produces the curved injector spray holes or bores found to achieve a superior fuel injection spray by employing conventional electrical or electron discharge machining (EDM) techniques. The details of a known method for electrical discharge machining of curved holes are disclosed in U.S. Pat. No. 2,902,584 incorporated herein by reference. The present invention employs a uniquely configured helical EDM electrode which simply and efficiently forms the spray holes of the subject invention in a single step. The subject method, moreover, eliminates the potentially costly and time consuming hand cutting and grinding steps that would be required to form a curved passage by other known methods.

Figures 2, 3, 4:
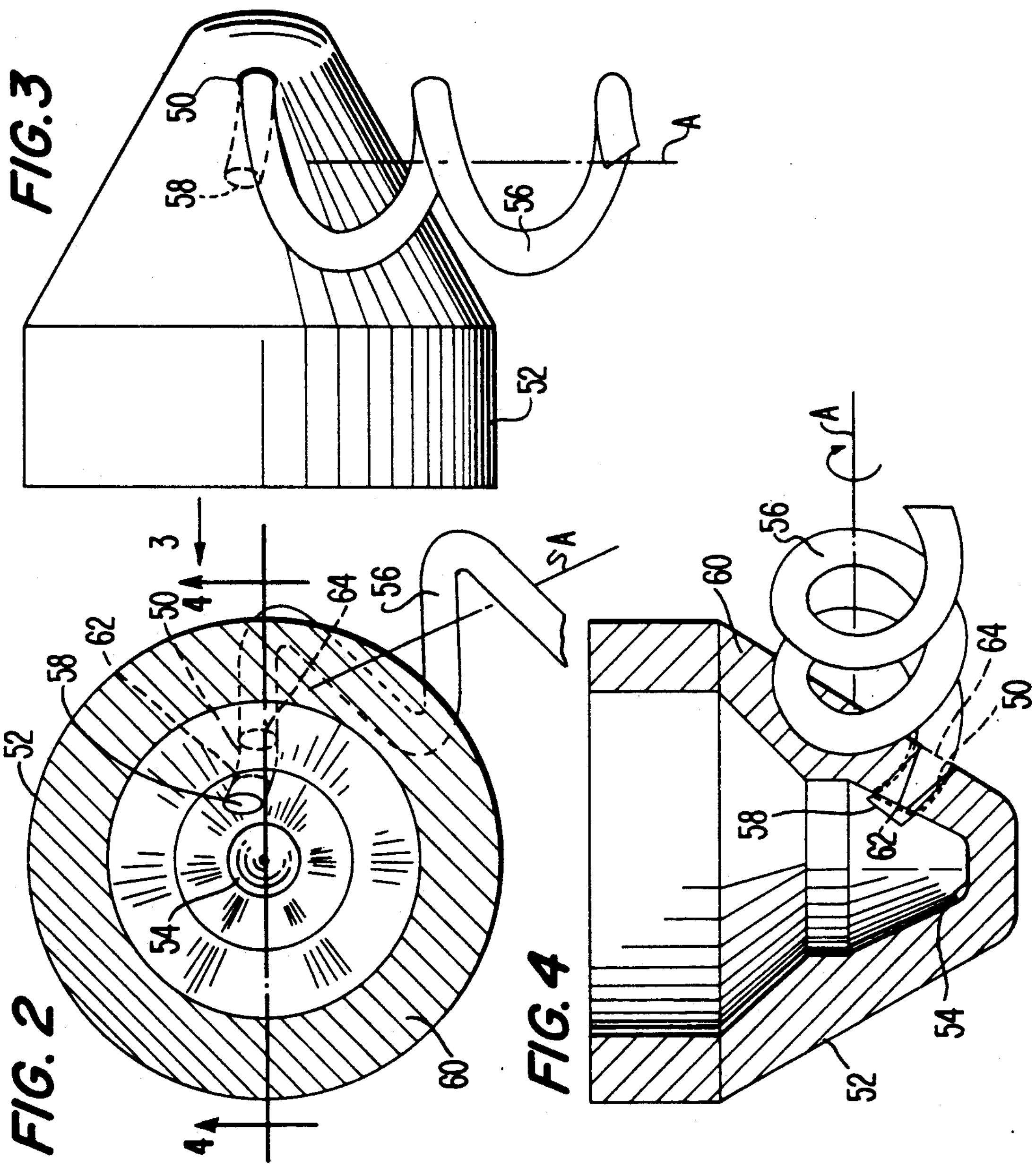
FIG. 2 is a cross-sectional view of a fuel injector nozzle being machined in accordance with the present invention taken in a plane perpendicular to the longitudinal axis of the injector.
FIG. 3 is a side elevational view of the fuel injector nozzle of FIG. 2 viewed in the direction of arrow 33 of FIG. 2.
FIG. 4 is a cross-sectional view of the fuel injector of FIG. 2 viewed along line 4—4 of FIG. 2.

FIGS. 2, 3 and 4 illustrate the formation of a curved spray hole 50 in a fuel injector nozzle tip 52 according to the present invention. FIG. 2 shows a top view of the injector nozzle tip looking toward the injector sac 54. FIG. 3 is a side view of the injector nozzle tip 52 as seen in the direction of arrows 3—3 in FIG. 2. FIG. 4 is a front cross-sectional view of the injector nozzle tip 52 taken along line 4—4 of FIG. 2.

Conventional electrical discharge machining (EDM) techniques are used in combination with a unique helical electrode 56, which will be described in detail in connection with FIG. 5 hereinbelow to form a plurality of curved spray holes in the tip of a fuel injector. Only one such spray hole 50 is shown in FIGS. 2, 3 and 4; however, additional curved spray holes would be substantially identical to spray hole 50. The electrode 56 is connected at one end to an EDM apparatus (not shown). The tip 58 of the helical electrode 56 is directed through the injector wall 60 from the exterior to the interior by advancing it along a path coincident with the longitudinal axis of the electrode while simultaneously rotating the electrode about this longitudinal axis. FIGS. 2 to 4 show the electrode longitudinal axis A. The direction of rotation of the electrode 56 as the tip 58 is advanced through the fuel injector nozzle wall 60 is shown by the curved arrow R, also in FIG. 4.

Collectively, FIGS. 2, 3 and 4 illustrate the path traveled by the helical EDM electrode 56 through the fuel injector wall 60 to produce a curvilinear spray hole 50 in the injector nozzle tip 52. As FIGS. 2 and 4 clearly demonstrate, the electrode 56 exits the nozzle tip 52 at a point 62 that is somewhat above and offset from the entry point 64. The configuration of the helical EDM electrode 56 produces a curved hole through the injector wall 60 connecting the electrode entry point 64 and the electrode exit point 62 as the electrode is simultaneously rotated about its axis A and fed or advanced along axis A. To achieve the desired hole configuration, the helical electrode must have its rotational velocity $V_r$ related to its velocity of advancement $V_d$ along its axis in accordance with the following formula:

$$V_r = P\,V_d$$

where $V_r$ = rotational velocity of the helical electrode $V_d$ = velocity of advancement of helical electrode along its central axis P = pitch of helical electrode, i.e., number of turns per unit of length Removal of the electrode 56 from the injector tip 52 is accomplished by simply reversing the rotation and feed directions. The electrode is then positioned on the nozzle exterior at the desired location of the next spray hole and simultaneously rotated and fed or advanced through the wall 60 into the injector interior by conventional EDM techniques, which can be controlled automatically or performed manually. This process is repeated until all of the spray holes required for the injector have been formed about the circumference of the injector nozzle tip.

Figure 5:
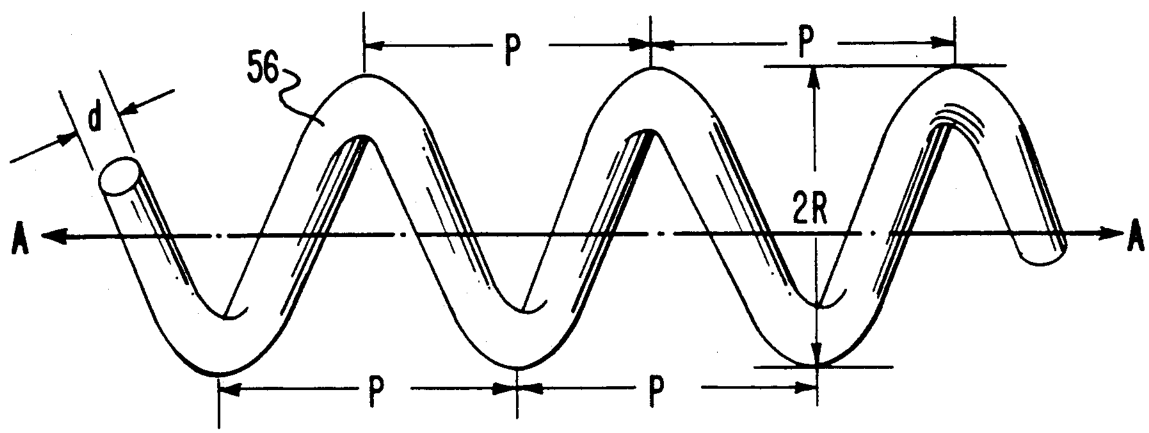
FIG. 5 is a schematic view of a helical EDM electrode according to the present invention.

An electrode which can be used to produce curved fuel injector spray holes in accordance with the present invention is shown in FIG. 5. The EDM electrode 56 illustrated in FIG. 5 is the preferred configuration for use in the present process. However, variations of this configuration which will function for the described purpose are contemplated to be within the scope of the present invention.

Electrode 56 is formed in the shape of a helix having a constant pitch p. The electrode 56 may be shaped into a constant pitch helix by wrapping the electrode material, which is preferably a spring or similar type of wire, around a mandrel (not shown). Other methods of producing a constant pitch helix could also be employed, however. The wire preferred for this purpose has a diameter (d in FIG. 5) within the range of 0.001 to 0.015 inch. Wire having a diameter within this range is formed into a helix having a diameter, represented by 2R in FIG. 5, that is about 5 to 20 times the diameter of the wire. The pitch of the helix, represented by p in FIG. 5, is also preferably about 5 to 20 times the diameter of the wire. The radius R of the helix is selected to be substantially equal to the desired radius of curvature of the curved hole to be formed by electrical discharge machining using the helical electrode 56. Dashed line A in FIG. 5 represents the central axis of the helix.

Figure 6:
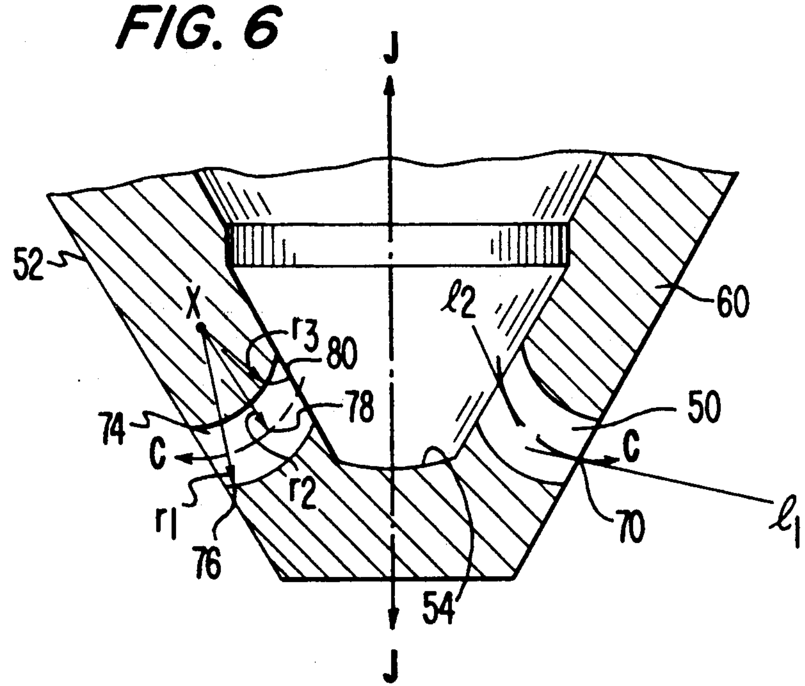
FIG. 6 is a cross-sectional view of a fuel injector tip including two curved spray holes machined according to the present invention.

FIG. 6 illustrates some of the relationships between the configuration of the curved injector spray holes formed according to the present invention and the configuration of the helical electrode used to form these curved holes. The curved spray holes of the present invention are produced when the electrode enters the injector wall 60 along a curved path whose central axis is tangent to a first line, $l_1$, at the electrode entry point 70. As the electrode is advanced axially and rotated as described above and exits the injector wall 60 into the interior of the injector at exit point 72, the central axis of the curved path is tangent to a second line, $l_2$. Line $l_2$ is more nearly parallel to the central axis J of the central cavity of the injector than is line $l_1$. The helical configuration of the electrode produces a curved passage or hole 50 connecting entry point 70 and exit point 72 as the electrode is fed and rotated through the injector wall.

The injector 52 shown in FIG. 6 also includes a second curved spray hole 74 with a central axis C. Relationships between the dimensions of a helical electrode, such as electrode 56 in FIG. 5, used to form the curved hole and the curved hole configuration are shown in conjunction with hole 74. Point X in FIG. 6 is located along the central axis A of electrode 56. The lines $r_1$, $r_2$ and $r_3$ drawn from point X to various points on the curved hole 74 and central axis C illustrate the approximate mathematical relationships between the dimensions of helical electrode and the locations of these points. Line $r_1$ extends from point X to point 76 on the approximate outside or bottom curvature of hole 74. Line $r_2$ extends from point X to point 78 on the central axis C. Line $r_3$ extends from point X to point 80 on the approximate inside or top curvature of hole 74. The following relationships can be defined:

$$r_1 \sim R$$

$$r_2 \sim R - 1/2\,d$$

$$r_3 \sim R - d$$

where R is equal to the radius of the helix and d is equal to the diameter of the wire or other material used to form the helix. The foregoing relationships can be more clearly seen in FIGS. 2, 3 and 4, which illustrate the helical electrode in the process of forming the curved spray holes.

To produce even greater fuel injector flow efficiency, the fuel inlet edge of each curvilinear spray hole in the interior of the injector can be flared or radiused.

The flared edges further enhance the fuel flow into the curvilinear spray hole and, as a result, produce an even more efficient fuel injection spray from the nozzle.

While electrical discharge machining is the preferred method of forming the curved spray holes according to the present invention, the electrode may be moved or controlled manually or automatically. Any of the available methods of controlling an automatic operation, moreover, can be employed to control the movement of the helical electrode into and out of the injector tip wall. Additionally, the feed rate of the helix may be predetermined, and the rate of feed may automatically controlled so that it is a function of or is determined by such parameters as the rate of erosion of the tip wall or the volume of the material eroded. Other control parameters could also be employed to automatically set the rate of feed of the electrode.

INDUSTRIAL APPLICABILITY

The present invention will find its primary application in the formation of curved spray holes in a fuel injector nozzle. However, it can also be utilized in any application wherein it is desired to simply and easily form holes or bores having a curvilinear configuration with a desired radius of curvature.

I claim:

1. A method of using a helical electrode for electrical discharge machining a curved spray hole in a fuel injector nozzle wall surrounding a fuel cavity to facilitate the non-turbulent flow of fuel to a combustion chamber comprising the steps of:

a. advancing the helical electrode along its longitudinal axis toward a surface of a fuel injector nozzle wall to be machined so that the electrode penetrates the surface at a first point along a first line tangent to the central axis of the spray hole and enters the injector wall at said first point;

b. simultaneously with step "a", rotating said electrode about said longitudinal axis of said electrode, thereby directing said electrode into the injector interior along a path which defines a segment of a helix so that the electrode exits the nozzle wall and enters the fuel cavity at a second point along a second line tangent to the central axis of the hole, wherein said second line is more nearly parallel to the central longitudinal axis of the interior of the fuel injector nozzle than is the first line and wherein for every vertical plane intersecting the central axis of each hole, there are points on the central axis of the hole lying outside said vertical plane.

2. The method described n claim 1, wherein said electrode comprises a constant pitch helix having a radius of curvature substantially equal to the radius of curvature of said hole.

3. The method described in claim 2, wherein said helix is simultaneously rotated about its longitudinal axis and advanced along its longitudinal axis through the injector wall so that $$V_r = P\ V_d$$

wherein $V_r$ is equal to the rotational velocity of the helix, $V_d$ is equal to the velocity of advancement of the helix and P is equal to the pitch of the helix.

4. The method described in claim 1, wherein said rotation and axial movement of the electrode into the injector nozzle wall is controlled automatically.

5. The method described in claim 2, wherein said helix is formed of wire and the diameter of said helix is within the range of about 5 to 20 times the diameter of said wire.

6. A fuel injector for periodically injecting fuel into the combustion chamber of an internal combustion engine comprising:

an injector body adapted to receive fuel, said body including a nozzle containing a fuel cavity for receiving the fuel prior to injection, said nozzle including a nozzle wall surrounding said cavity and thereby defining a nozzle interior and a nozzle exterior;

flow improvement means for facilitating the nonturbulent flow of fuel from said cavity to said combustion chamber, said flow improvement means including a plurality of curvilinear spray holes formed in said nozzle wall immediately downstream from said fuel cavity, each said curvilinear spray hole being curvilinear throughout its length between the fuel cavity and the nozzle exterior, wherein the effective cross-sectional area of said fuel cavity is substantially greater than the cross-sectional flow area of any one of said curvilinear spray holes.

7. The fuel injector described in claim 6, where each said curvilinear spray hole is formed by directing an electrical discharge machining electrode through the nozzle wall electrode comprises a constant pitch helix having a radius of curvature substantially equal to the radius of curvature of said hole.

8. The fuel injector described in claim 7, wherein said electrode is in the shape of a constant pitch helix.

9. The fuel injector described in claim 8, wherein each said curvilinear hole is formed by simultaneously rotating said electrode about its longitudinal axis and advancing said electrode along its longitudinal axis from the nozzle exterior to the nozzle interior and the electrode rotational velocity is equal to the product of the pitch of the helix and the velocity of axial advancement of the electrode so that $$V_r = P\ V_d$$

where $V_r$=electrode rotational velocity,

P=pitch, and $V_d$=velocity of axial advancement of the electrode.

10. The fuel injector described in claim 8, wherein said electrode is formed of wire and the diameter of the helix is within the range of about 5 to 20 times the diameter of the wire.

11. The fuel injector described in claim 7, wherein the radius of curvature of each said curvilinear spray hole is approximately equal to the radius of curvature of said electrode.

12. A fuel injector for periodically injecting fuel into the combustion chamber of an internal combustion engine comprising:

an injector body adapted to receive fuel, said body including a nozzle containing a fuel cavity for receiving the fuel prior to injection, said nozzle including a nozzle wall surrounding said cavity;

flow improvement means for facilitating the non-turbulent flow of fuel from said cavity to the means including a plurality of curvilinear spray holes formed in said nozzle wall, wherein said curvilinear spray holes are each defined by a segment of a helical path, wherein said spray holes are each formed to have a curvilinear central axis such that a first line is tangent to the central axis at a first point where the central axis intersects the nozzle exterior and a second line is tangent to the central axis at a second point where the central axis intersects the nozzle interior and said second line is more nearly parallel to the longitudinal axis of the fuel injector than is said first line, and wherein for every vertical plane intersecting the central axis of each hole, there are points on the central axis of the hole lying outside said vertical plane.

13. The fuel injector described in claim 12, wherein each said curvilinear spray hole is formed by directing a constant pitch helix electrode through the nozzle wall from said first point to said second point.

14. The fuel injector described in claim 13, wherein each said curvilinear hole is formed by simultaneously rotating said electrode about its longitudinal axis and advancing said electrode along its longitudinal axis from the nozzle exterior to the nozzle interior and the electrode rotational velocity is equal to the product of the pitch of the helix and velocity of axial advancement of the electrode so that $$Vr = PVd$$

where $Vr$ = electrode rotational velocity, $P$ = pitch, and $Vd$ = velocity of axial advancement of the electrode.

15. The fuel injector described in claim 13, wherein said electrode is formed of wire and the diameter of the helix is within the range of about 5 to 20 times the diameter of the wire.

16. The fuel injector described in claim 13, wherein the radius of curvature of each said curvilinear spray hole is approximately equal to the radius of curvature of said electrode.

* * * * *